(12) United States Patent
Algüera Gallego et al.

(10) Patent No.: US 8,651,339 B2
(45) Date of Patent: Feb. 18, 2014

(54) FILLING SYSTEM FOR THE METERED DELIVERY OF A LUBRICANT

(75) Inventors: José Manuel Algüera Gallego, Aschaffenburg (DE); Jürgen Seigies, Mömbris (DE)

(73) Assignee: Jost-Werke GmbH, Neu-Isenberg (DE)

( * ) Notice: Subject to any disclaimer, the term of this patent is extended or adjusted under 35 U.S.C. 154(b) by 260 days.

(21) Appl. No.: 12/733,372

(22) PCT Filed: Aug. 25, 2008

(86) PCT No.: PCT/EP2008/061092
§ 371 (c)(1),
(2), (4) Date: Feb. 25, 2010

(87) PCT Pub. No.: WO2009/027374
PCT Pub. Date: Mar. 5, 2009

(65) Prior Publication Data
US 2010/0206901 A1      Aug. 19, 2010

(30) Foreign Application Priority Data
Sep. 1, 2007   (DE) .......................... 10 2007 041 597

(51) Int. Cl.
*B67D 7/60*         (2010.01)
(52) U.S. Cl.
USPC ............................ 222/326; 222/390; 184/38.2
(58) Field of Classification Search
USPC ........... 222/95, 326, 390, 309, 147, 330, 259;
184/39, 39.1, 105.1, 38.4, 37, 38.1,
184/38.2; 401/175; 92/172; 604/110
See application file for complete search history.

(56) References Cited

U.S. PATENT DOCUMENTS

| 1,117,851 | A | * | 11/1914 | Hullinger | ........................ | 119/659 |
| 1,437,169 | A | * | 11/1922 | Critchlow | ...................... | 222/390 |
| 1,471,330 | A | | 10/1923 | Farmer | | |
| 1,506,018 | A | * | 8/1924 | Lyman | ............................ | 92/246 |
| 1,703,278 | A | | 2/1929 | Arthur | | |

(Continued)

FOREIGN PATENT DOCUMENTS

| CA | 2 224 024 A1 | 6/1999 |
| DE | 509 861 | 10/1930 |

(Continued)

*Primary Examiner* — Kevin P Shaver
*Assistant Examiner* — Patrick M Buechner
(74) *Attorney, Agent, or Firm* — Hudak, Shunk & Farine Co. LPA

(57) ABSTRACT

A description is given of a filling system for the metered delivery of a lubricant, comprising a container for receiving the lubricant, wherein a rod interacts with the container, is mounted movably with respect to it and forces the lubricant out of an outlet opening arranged in the container. The invention also relates to cartridges for use in the filling system. One of the underlying objects of the invention was that of providing a filling system which can be supplemented by simple workshop means and enables the operator to fill up a lubricating system in a vehicle effortlessly within a short time. This object is achieved by a filling system in which the rod is rotatably mounted with respect to the container and turning of the rod in a predetermined direction of rotation brings about a reduction in the storage volume in the container or a handheld device and in which the rod has means for establishing a rotationally fixed connection with an adaptable turning tool.

4 Claims, 5 Drawing Sheets

(56) References Cited

U.S. PATENT DOCUMENTS

| | | | |
|---|---|---|---|
| 1,965,271 A | | 7/1934 | Wharton |
| 2,051,736 A | | 8/1936 | Misfeldt |
| 2,123,731 A | * | 7/1938 | Kahn .......................... 222/390 |
| 2,131,487 A | | 9/1938 | Tear |
| 2,485,467 A | * | 10/1949 | Weisbaum .................... 222/390 |
| 2,656,953 A | * | 10/1953 | Rich ............................ 222/390 |
| 3,774,816 A | * | 11/1973 | Bratton ........................ 222/391 |
| 3,973,699 A | * | 8/1976 | Cook ............................ 222/108 |
| 4,252,118 A | * | 2/1981 | Richard et al. ............... 604/110 |
| 4,648,872 A | * | 3/1987 | Kamen ......................... 604/155 |
| 4,921,130 A | * | 5/1990 | Hollberg ........................ 222/46 |
| 5,076,473 A | | 12/1991 | Steiner |
| 5,183,466 A | * | 2/1993 | Movern ........................ 604/110 |
| 5,219,099 A | * | 6/1993 | Spence et al. ................ 222/325 |
| 5,242,400 A | * | 9/1993 | Blake et al. .................. 604/110 |
| 5,658,053 A | | 8/1997 | Vencill |
| 5,687,815 A | * | 11/1997 | Antila et al. .................. 184/7.4 |
| 5,884,812 A | | 3/1999 | Stawowski |
| 6,129,710 A | * | 10/2000 | Padgett et al. ............... 604/195 |
| 6,161,734 A | * | 12/2000 | Winkler ........................ 222/390 |
| 6,168,052 B1 | * | 1/2001 | Keller .......................... 222/333 |
| 6,318,596 B1 | * | 11/2001 | Wiesner ............................ 222/1 |
| 6,371,336 B1 | * | 4/2002 | Keller .......................... 222/333 |
| 6,395,006 B1 | * | 5/2002 | Burchett ........................ 606/93 |
| 6,550,643 B1 | * | 4/2003 | Foster et al. ................... 222/63 |
| 6,675,992 B2 | * | 1/2004 | Schumann .................... 222/390 |
| 2006/0264824 A1 | * | 11/2006 | Swisher ........................ 604/110 |
| 2007/0179442 A1 | * | 8/2007 | Shue et al. .................... 604/110 |
| 2010/0276458 A1 | * | 11/2010 | Buck ............................. 222/327 |

FOREIGN PATENT DOCUMENTS

| | | |
|---|---|---|
| DE | 642 077 | 2/1937 |
| DE | 15 36 003 A1 | 10/1969 |
| DE | 2 051 107 | 4/1971 |
| DE | 2 111 962 | 9/1972 |
| DE | 81 25 319 | 8/1981 |
| DE | 30 48 520 | 7/1982 |
| DE | 82 21 043 U1 | 12/1982 |
| DE | 197 49 512 A1 | 9/1998 |
| DE | 100 58 673 | 6/2002 |
| DE | 697 07 839 | 8/2002 |
| DE | 20 2004 002 186 | 2/2004 |
| DE | 202 20 109 U1 | 5/2004 |
| DE | 20 2004 019342 U1 | 6/2005 |
| GB | 1 118 355 | 7/1968 |

* cited by examiner

FILLING SYSTEM FOR THE METERED DELIVERY OF A LUBRICANT

FIELD OF THE INVENTION

The invention relates to a filling system for the metered delivery of a lubricant, comprising a container for receiving the lubricant, wherewith a rod interacts with the container, is mounted movably with respect to it, and forces the lubricant out of an outlet opening disposed in the container. The invention further relates to cartridges for use in the filling system.

BACKGROUND OF THE INVENTION

Customary lubricating systems, particularly on commercial vehicles, are filled from large lubricant containers when they need refilling. These large containers are frequently large and unwieldy, because they require quite large stores of lubricant to be held in them. The term "lubricant" should be understood to include, in particular, highly viscous greases having a paste consistency. In order to minimize the time consumed in refilling, either the container itself must be equipped with costly and complex delivery technology, or it must be emptied using a suitable delivery apparatus.

For delivery of relatively small amounts of lubricants, cartridges or bags are known which are emptied by means of manual presses. Such a manual press operating by manual force for expelling a lubricant is disclosed in, e.g., DE 19749512A1. However, use of such a manual press results in a relatively long duration of refilling, and is inconvenient and difficult for the operator, particularly if it is desired to deliver the entire contents of the cartridge in a short time.

SUMMARY OF THE INVENTION

Accordingly, an underlying problem of the present invention was to devise a filling system which works well with simple shop means and which enables one in a short time to refill a lubricant system of a vehicle, without undue stress or difficulty on the part of the user.

A second underlying problem of the invention was to devise cartridges for use in the described filling system.

These problems were solved according to the invention by a system wherein the rod is rotatably mounted with respect to the container, and rotation of the rod in a predetermined direction of rotation brings about a reduction in the storage volume in the container or a handheld device; and wherein the rod has means for establishing a rotationally fixed connection with an adaptable rotating implement.

The term "adaptable rotating implement" is understood to mean, e.g., a rotational driver device (e.g. a battery-operated nut driver or even a wrench). As means on the rod for establishing a rotationally rigid connection, there may be provided, e.g., polygonal key configurations, e.g. square or hexagonal, which in particular may be provided on one end of the rod. As alternatives to key configurations (or sockets), other rapidly releasable shaft to driver couplings may be employed, e.g. bolt connections.

The essential advantage of the invention results from the reduction of the storage volume by the action of the rotatable rod on the contents. The energy needed to expel the lubricant is essentially supplied by the rotational implement, wherewith the speed of expulsion of the lubricant is controllable via the rotational speed of the rotational implement. The operator needs only to hold the container (or a manual apparatus associated with the container) in place.

If the container comprises a cartridge with a displaceable piston disposed inside, preferably the rod is in the form of a spindle. With this embodiment, the expulsion of the lubricant is brought about by the piston which as a result of the rotation of the spindle presses the lubricant in the delivery device in the direction of the outlet opening. Typically, the cartridge will have a cylindrical cross section.

According to a first advantageous embodiment, the spindle inter-engages with a thread disposed in the cartridge. The thread should be provided in a head-side end wall of the cartridge, so that the spindle becomes progressively screwed-in axially over the extent of the cartridge. With this embodiment, the cartridge with its content of lubricant, and the piston and spindle, together form a coordinated module. Thus, the user does not require any additional devices and can begin immediately after applying the rotational implement to deliver lubricant to the subject lubricant container [(on the destination vehicle or the like)].

According to this embodiment, the piston and spindle may together be of unit construction.

With this arrangement, it is possible for the lubricant to be disposed on the side of the piston which is directed toward the spindle. An advantage of such an embodiment is that the overall length of the cartridge assembly containing the piston and spindle can be kept very small, which is particularly advantageous in that it offers a small shipping volume of the cartridge. The spindle does not project from the cartridge until it is rotated, at which time the overall length of the cartridge assembly begins to increase gradually.

Advantageously, with this embodiment the outlet opening and the thread for guiding the spindle are disposed on the same side of the cartridge.

According to a second advantageous embodiment, the cartridge is inserted into a manual apparatus, wherewith the spindle inter-engages with a thread disposed in the manual apparatus, and the end of the spindle comes to abut against the piston. The means of guiding of the spindle in the thread is thus no longer supplied in the cartridge itself but in the manual apparatus. This has the advantage that the spindle is not discarded after the emptying of the cartridge, but can be reused.

With both of the above-described embodiments, the lubricant can be disposed on the side of the piston which is directed away from the piston. As the spindle is rotated, the piston disposed at the end of the spindle is driven inward, and lubricant is expelled through the outlet opening, which opening is disposed on the side of the cartridge which is opposite to the side on which the thread is disposed.

According to a third embodiment, the container comprises a lubricant bag inserted in the manual apparatus, and the rod comprises a spindle which inter-engages with a thread disposed in the manual apparatus, which spindle has a piston on its end. With this embodiment, the spindle, piston, and manual apparatus together comprise a module which is reusable. After the lubricant bag is emptied, the only thing that needs to be disposed of is the bag itself or alternatively the bag may be re-filled.

According to a conceptually different embodiment, the container comprises a cartridge with a displaceable piston disposed inside, wherewith a region (segment) of the rod disposed inside the cartridge is in the form of a spindle, and the piston is guided by a thread on the spindle. Only the piston travels through the cartridge. This embodiment also has the advantage of small shipping volume. Also, there are no components which project from the cartridge during the emptying of the cartridge, thus there is no problem of soiling resulting from lubricant which adheres to the spindle.

With this embodiment it is particularly advantageous if the rod is radially rotatably mounted in the opposite end wall of the cartridge, with the lubricant being disposed between the piston and the outlet opening.

Advantageously, means are provided to prevent the piston from rotating in the circumferential direction along with the spindle. These means may comprise axially oriented guide rails or a polygonal cross sectional geometry of the cartridge.

A principle of the above-described embodiments is that the piston is moved in the axial direction by rotation of the spindle.

According to an alternative embodiment of a filling system with a structurally different concept, the container comprises a lubricant bag which is inserted into a manual apparatus and is fixed to the rod by means of an attachment side of said bag. By rotation of the rod, the lubricant bag is wound up onto the rod, and lubricant is forced out, preferably through an outlet opening disposed on the side of the bag which is opposite to the attachment side. During this process, the rod retains its position in the axial direction. It is particularly advantageous if the lubricant bag is drawn in through a housing slot in the manual apparatus, whereby the lubricant is forced in the direction of the outlet opening.

According to another advantageous embodiment of the filling system, the rod is in the form of a first toothed shaft and the container is in the form of a lubricant bag, wherewith the first toothed shaft inter-engages with a second toothed shaft, and the lubricant bag is inserted between the toothed shafts at least one insertion side of said bag. For this process, at least the first toothed shaft is connected to a rotational implement, via means associated with said shaft for establishing a rotationally rigid connection. It is also possible to provide means for driving the second toothed shaft synchronously with the first toothed shaft.

By adjustment of the gap between the toothed shafts, only the lubricant bag is drawn in, and the lubricant is forced in the direction of an outlet opening, which opening is advantageously disposed on the side of the bag which is opposite to the insertion side.

With all of the embodiments of the filling system, advantageously a lubricant hose having a lubrication nipple fitting at its end can be attached to the outlet opening. This fitting is used to connect to the lubrication system of the vehicle being lubricated.

The underlying problem of the invention is also solved by a filling system for metered delivery of a lubricant, comprising a container for receiving the lubricant, wherein a piston which is movably mounted with respect to said container interacts with said container, which piston forces the lubricant out of an outlet opening disposed in the container. The departure from the state of the art in this solution is that a through-going opening with a connecting flange is formed in the container on the side thereof which is opposite to the side of the piston directed toward the lubricant.

With this embodiment, the piston is moved by a gas which expands into the container, wherewith the piston forces the lubricant in the direction of the outlet opening.

Advantageously, a pressure cylinder can be connected to the connecting flange. The pressure cylinder should be of an appropriate size in relation to the amount of lubricant to be expelled and the displacement needed therefore. This connection of the pressure cylinder can be realized, e.g., via a threaded connection. The pressure cylinder may be in the form of, e.g., an ordinary commercially available $CO_2$ cartridge.

The desired objective can be achieved according to the invention if the cartridge comprises a piston and a spindle which engages the piston, wherewith the spindle also engages a thread in the cartridge, and has on one end means for establishing a rotationally rigid connection to an adaptable rotational implement.

Also suitable are cartridges having a rod which extends out from the cartridge at least one end, and which has inside the cartridge a region (segment) in the form of a spindle as well as a threaded piston, wherewith the rod has on an end means for establishing a rotationally rigid connection to an adaptable rotational implement.

With this embodiment, at least one guide means may be provided on the interior side of the peripheral wall, which guide means prevents rotation of the piston in the circumferential direction along with the rotation of the spindle.

The cartridge may have, at the transition region between the piston and the spindle, a breaking point where a breakable closure device will be broken. This breaking point may be disposed at the end of the axial excursion of the piston, so as to separate the piston from the spindle. Thus the cartridge and the piston disposed therein are rendered unusable, and one prevents situations such as cartridges with inferior lubricant content entering the stream of commerce, or spent cartridges being refilled with lubricant of inferior quality.

BRIEF DESCRIPTION OF THE DRAWINGS

For improved understanding, the invention will be described in more detail hereinbelow with reference to a total of nine Figures.

DETAILED DESCRIPTION OF THE INVENTION

Figure 1:
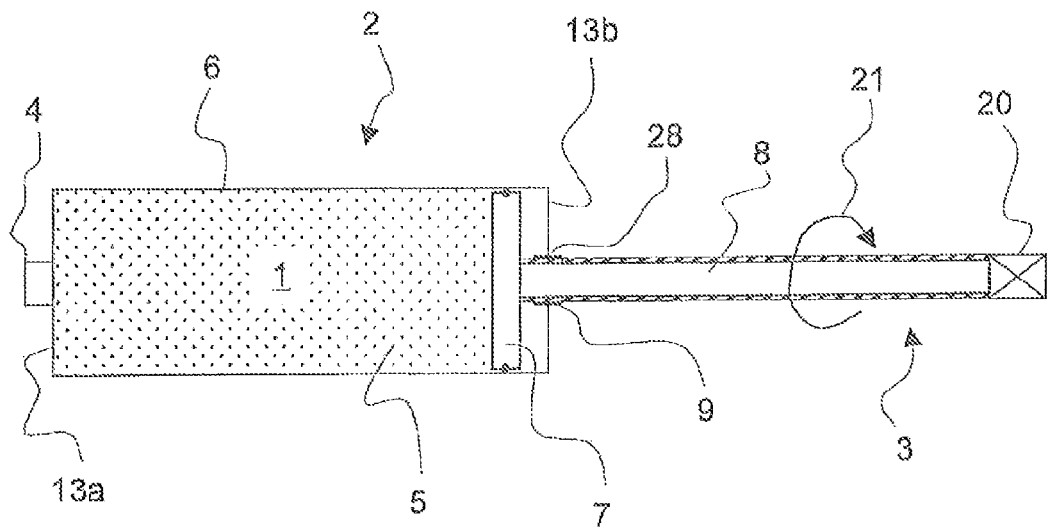
FIG. 1 is a schematic longitudinal cross section through a filling system according to a first embodiment.

FIG. 1 shows a filling system according to a first embodiment, in longitudinal cross section. The filling system comprises a cylindrical cartridge 6 which serves as a container 2 for the lubricant 1. The axial extent of the cartridge 6 is a multiple of its diameter.

The cartridge 6 is closed off by end walls (13a, 13b, respectively). End wall 13a has a centrally disposed outlet opening 4 through which lubricant 1 can exit the cartridge 6. For the purposes of storage and shipping, the outlet opening 4 is closed off with a removable film in order to avoid unintended losses of the lubricant 1.

The end wall 13b which is opposite to end wall 13a has a centrally disposed through-going opening 28 through which a plunger 3 is introduced into the interior of the cartridge. The plunger 3 is in the form of a spindle 8 over nearly its entire length apart from a polygonal region, e.g. key configuration, 20, at its distal end which allows a rotationally fixed connection to a rotational implement to be established; the interior region of plunger 3 interior to the cartridge 6 bears a piston 7.

In the interior of the opening 28 in the end wall 13b a thread 9 is cut which cooperates with a thread on the spindle 8, whereby rotational movement of the spindle 8 in direction 21 results in lateral translational movement of the piston 7. The length of the spindle 8 should correspond at least to the length of the cartridge 6, in order to enable complete emptying of the cartridge 6.

The filling system has a storage volume 5 for receiving the lubricant 1, which volume 5 is defined by the cartridge with its end wall 13a and the piston 7. The piston 7 is axially movably guided by the walls of the cartridge 6, and seals the storage volume 5 in the radial direction at the region of transition between the piston 7 and the cartridge 6. When the spindle 8 is rotated, the piston 7 is moved in the direction of the outlet opening 4, whereby the storage volume 5 becomes smaller, causing the lubricant 1 to be expelled from the outlet opening 4.

Figure 2:
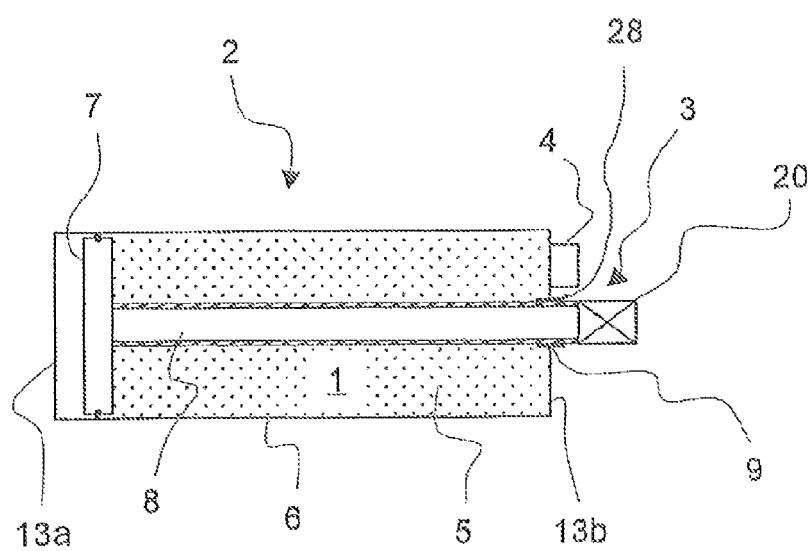
FIG. 2 is a schematic longitudinal cross section through a filling system according to a second embodiment.

An alternative embodiment is illustrated in FIG. 2, wherein in the filled state of the cartridge 6 the piston 7 and spindle 8 are fully extended into the cartridge, wherewith essentially the only part of the plunger assembly which is exterior to the cartridge is the polygonal key region 20. The outlet opening 4 is disposed near the threaded opening 28 with thread 9 in the end wall 13b of the cartridge 6.

The storage volume 5 for the lubricant 1 in this embodiment is formed by the piston 7, the walls of the cartridge 6, and the end wall 13b. When the spindle 8 is rotated, the piston is withdrawn through the cartridge 6 in the direction of the end wall 13b, and forces the lubricant 1 in the direction of the outlet opening 4. The advantage of this embodiment is the compactness desirable e.g. for shipping, in that the spindle 8 is initially essentially interior to the cartridge 6, with very little of the spindle extending to the outside.

Figure 3A:
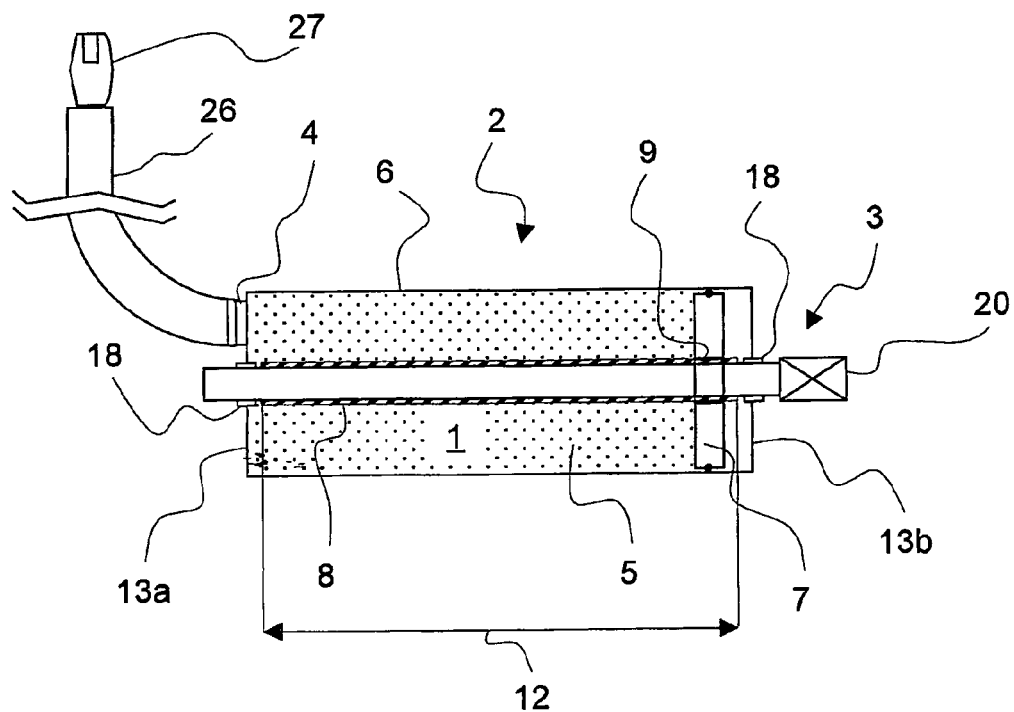
FIG. 3a is a schematic longitudinal cross section through a filling system according to a third embodiment, with the cartridge filled.

FIG. 3a illustrates an embodiment having a rod 3 which is fixed in the axial direction. Rod 3 extends completely through the cartridge 6 and is held at each end wall 13a, 13b by a respective bearing 18, 18. The rod 3 has a region 12 interior to the cartridge 6 which is in the form of a threaded spindle 8. At one end of the rod 3 extending exteriorly of the cartridge 6, a polygonal key region 20 is provided which enables rotationally rigid connection to a rotational drive means.

A piston 7 disposed in the cartridge 6 is engaged by the spindle 8. When the cartridge 6 is in the filled state, the piston 7 is disposed close to the end wall 13b. The storage volume 5 is formed by the cartridge 6, the piston 7, and the end wall 13a, and is completely filled with lubricant 1.

When the spindle 8 is rotated, the piston 7 moves over the spindle in the direction of the outlet opening 4. The lubricant 1 ahead of the piston 7 is thereby also forced in the direction of the outlet opening 4. A flexible lubricant hose 26 is provided at the outlet opening; at its opposite end, hose 26 bears a lubricating nipple connector 27 for connecting to a corresponding nipple of the apparatus to be lubricated.

Figure 3B:
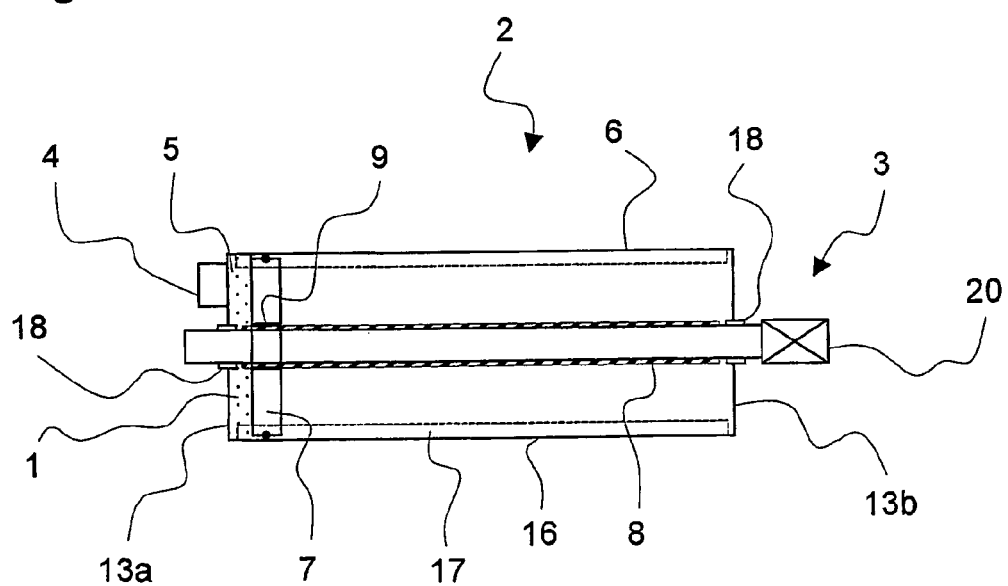
FIG. 3b is a schematic longitudinal cross section through a filling system according to a third embodiment, with the cartridge essentially emptied.

FIG. 3b illustrates the situation after nearly complete emptying of the lubricant 1. The piston 7 has been moved on the spindle 8 to essentially its maximum extent toward the end wall 13a, wherewith the storage volume 5 has been greatly diminished. Interiorly of the cartridge on the peripheral walls 16 one can now see the guide means 17 which have served to guide the piston 7 in the axial direction with the aid of corresponding recesses in the piston. The guide means 17 are in the form of axially directed ridges, and they prevent rotation of the piston in the circumferential direction as the rod 3 is rotated.

The essential advantage of this embodiment is that the rod 3 remains interior to the cartridge 6 regardless of the state of filling of the lubricant 1, and thus does not need to be accommodated outside the cartridge 6.

Figure 4:
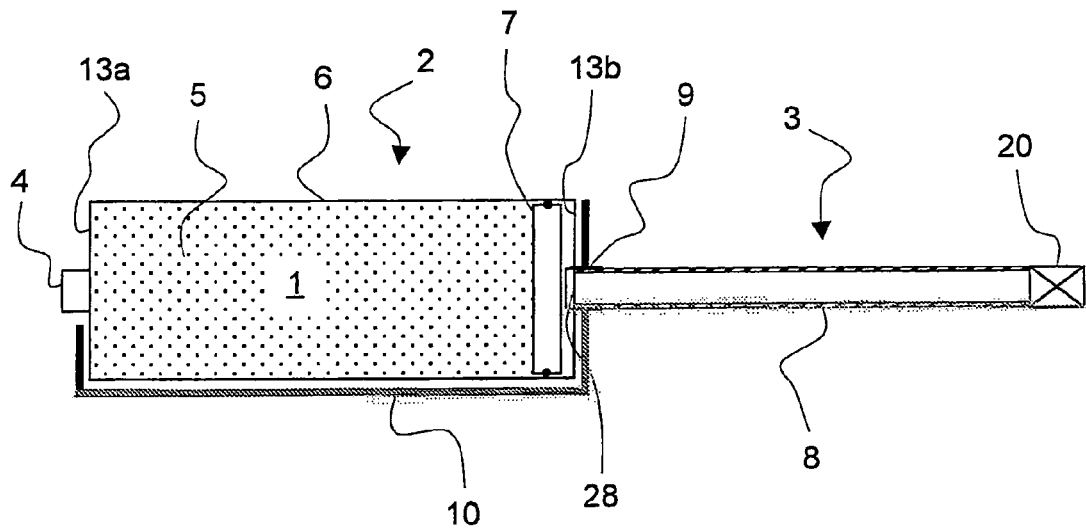
FIG. 4 is a schematic longitudinal cross section through a filling system according to a fourth embodiment.

FIG. 4 illustrates an alternative embodiment wherein the lubricant 1 is loaded into a cartridge 6 which is closed off at its ends by end walls (13a, 13b, respectively). The end wall 13a of cartridge 6 has a central outlet opening 4. In the opposite end wall 13b, a through-going opening 28 is provided as a breaking point where a breakable closure device will be broken. Thus the cartridge 6 itself has only a piston 7.

The cartridge 6 is installed in a manual apparatus 10 which accommodates via a thread 9 the rod 3 in the form of a spindle 8. When the rod 3 is rotated at the polygonal key region 20 provided to facilitate such rotation, the spindle 8 is forced into the cartridge 6. With continued rotation of the spindle 8, the piston 7 is advanced forcibly toward the end wall 13a, and the lubricant 1 is expelled.

The rod 3 is associated with the manual apparatus 10 such that after the emptying of the cartridge the rod 3 and spindle 8 can be reused. Also, the shipping volume of the cartridges 6 is very small.

Figure 5:
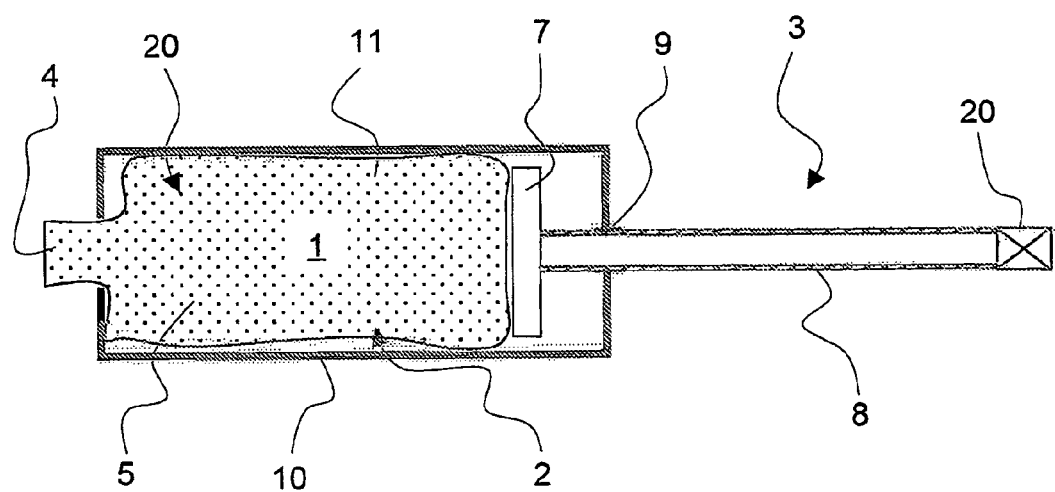
FIG. 5 is a schematic longitudinal cross section through a filling system according to a fifth embodiment.

Another embodiment is illustrated in FIG. 5. Here the piston 7 and rod 3 are both in the structural unit comprising the manual apparatus 10.

The container 2 for the lubricant 1 is a flexible lubricant bag 11 which has an outlet opening 4 on one side. The outlet opening comes to extend outside the manual apparatus 10, so that a lubricating hose (see FIG. 3a) can be connected to it. For filling the lubricant system, one merely inserts the lubricant bag 11 in the partially opened or to be opened manual apparatus 10. Then, the rod 3 is caused to rotate, via a rotating implement (not shown), so that the piston 7 is pressed against the lubricant bag 11. As the spindle 8 in the manual apparatus 10 is further rotated, the storage volume is decreased, and the lubricant 1 is expelled out of the outlet opening 4. After the lubricant is essentially completely removed from the lubricant bag 11, the spent bag can be removed and replaced with another filled lubricant bag 11.

Figure 6:
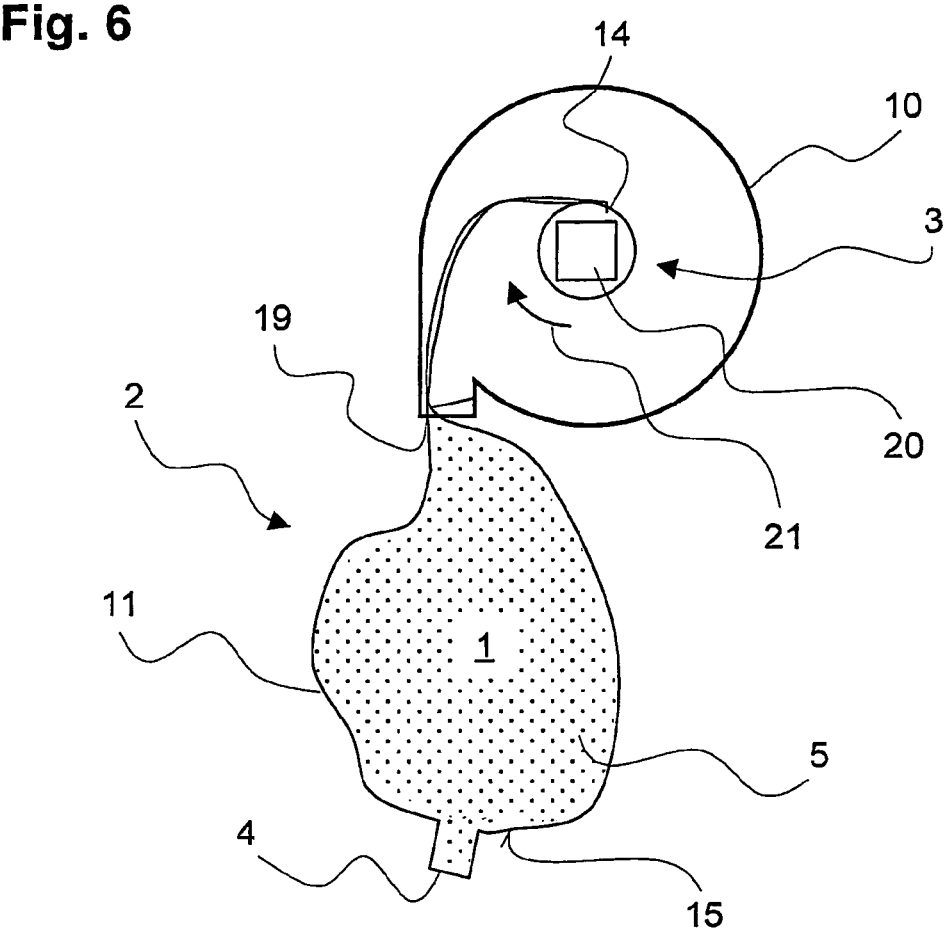
FIG. 6 is a cross section through a filling system according to a sixth embodiment.
Figure 7:
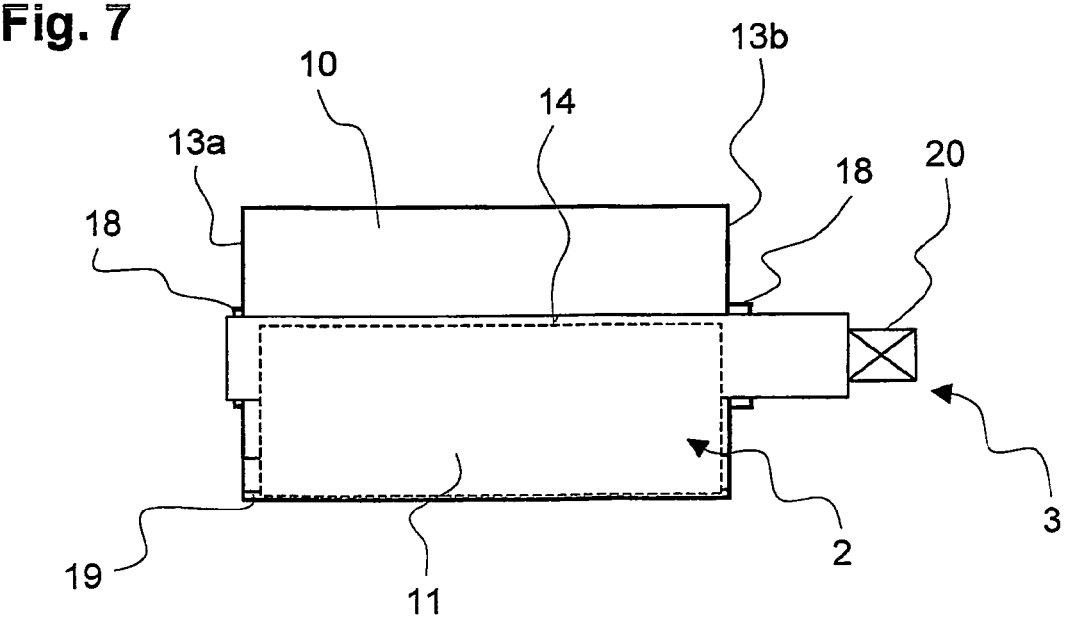
FIG. 7 is a longitudinal cross section through a filling system according to FIG. 6.

FIGS. 6 and 7 illustrate a different embodiment of the invention, wherein the lubricant 1 also is held ready for use in a lubricant bag 11. The lubricant bag 11 is first inserted with one attachment side 14 into a manual apparatus 10, and is fixed to a rod 3 which extends through the apparatus 10.

The manual apparatus 10 has an essentially cylindrical shape with a tangential housing slot 19 which runs parallel to the axial extent of the apparatus. The lubricant bag 11 is drawn through the slot 19 into the interior of the manual apparatus 10, with the slot having the function of expelling lubricant by squeezing. As the rod 3 is rotated, the lubricant bag 11 becomes wound around the rod, so that the storage volume 5 outside the apparatus 10 steadily decreases, and the lubricant 1 is pressed out of the outlet opening 4. Preferably, the outlet opening 4 is disposed on the opposite side 15 of the lubricant bag 11 from the attachment side 14.

As seen in the longitudinal cross sectional view in FIG. 7, the rod 3 extends through the manual apparatus 10 and is fixedly but rotatably mounted on bearings (18, 18) in the respective end walls (13a, 13b) of the apparatus 10. A polygonal key extension 20 of the rod 3 is present in the region of the end wall 13b.

Figure 8:
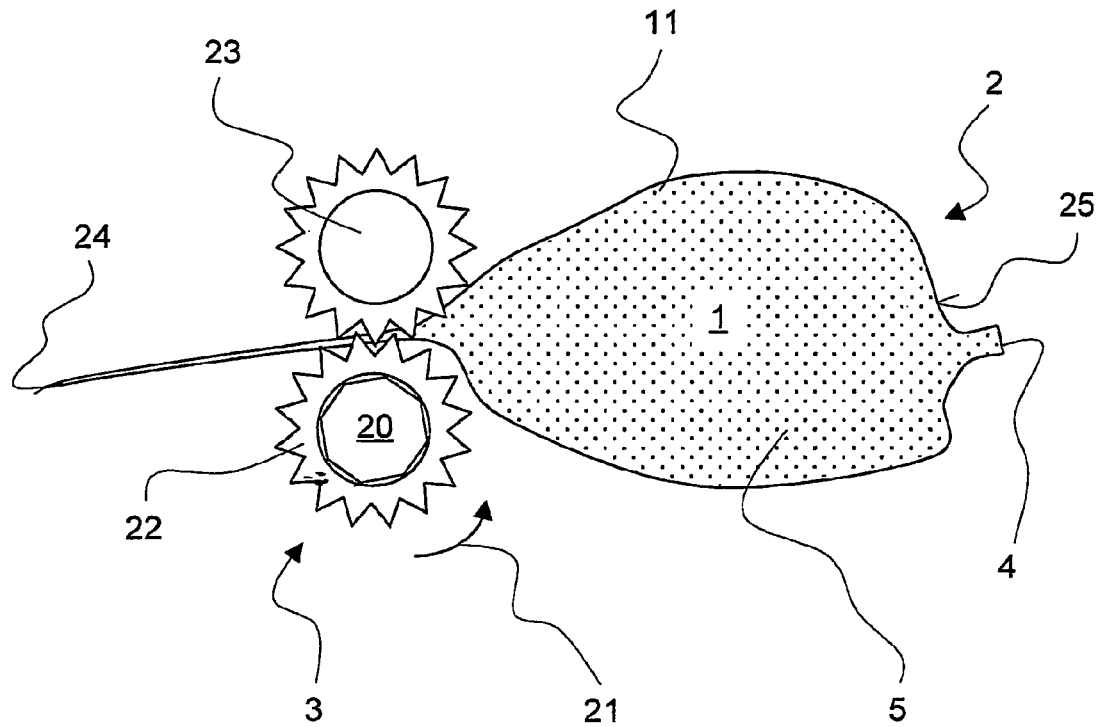
FIG. 8 is a cross section through a filling system according to a seventh embodiment.

Still another alternative embodiment of the invention is illustrated in FIG. 8. The container 2 is in the form of a lubricant bag 11, containing the lubricant 1. The bag 11 prior to being used is brought with its insertion side 24 into the area of engagement of two mutually engaged toothed shafts (22, 23). The first toothed shaft 22 has on at least one side an octagonal key surface 20 which can be rotationally rigidly connected to a rotational implement (not shown). As the first and second toothed shafts (22, 23) are set in motion, the lubricant bag 11 is drawn in increasingly to them (in and through their region of inter-engagement), so that lubricant 1, e.g. grease, is forced out of the outlet opening 4. The outlet opening 4 should be on the opposite side 25 to the insertion side 24 of the lubricant bag 11.

Figure 9:
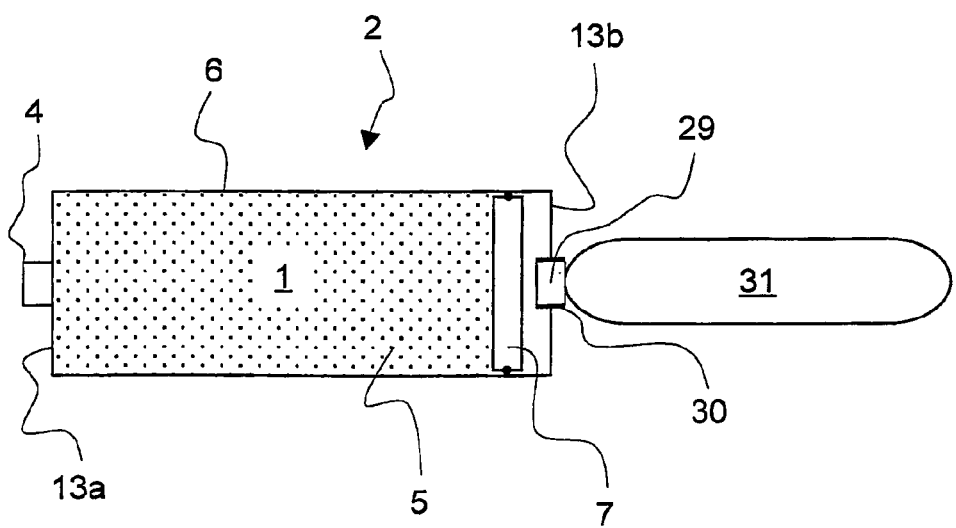
FIG. 9 is a longitudinal cross section through a filling system having a pressure cylinder.

A conceptually different embodiment of the filling system is illustrated in FIG. 9. In the end wall 13b of the container 2, a through-going opening 29 is provided which is concentrically surrounded by a connecting flange 30. A pressure cylinder 31 is releasably attached to the connecting flange 30. When the pressure cylinder 31 has been installed, it is opened and the pressurized gas which it contains is liberated, and flows into the container 2, to force the piston 7 in the direction of the opposite end wall 13a of the cartridge. The lubricant 1 which is ahead of the piston is thereby forced toward the outlet opening 4 and exits through said opening.

LIST OF REFERENCE NUMERALS

1 Lubricant.
2 Container.
3 Rod.
4 Outlet opening.
5 Storage volume.
6 Cartridge.
7 Piston.
8 Spindle.
9 Thread.
10 Manual apparatus.
11 Lubricant bag.
12 Spindle segment.
13a, 13b End wall of the cartridge or manual apparatus.
14 Attachment side.
15 Side opposite to the attachment side.
16 Peripheral wall.
17 Guide means.
18 Bearing.
19 Slot in housing.
20 Means for rotationally rigid connection, e.g. polygonal key configuration.
21 Direction of rotation.
22 First toothed shaft.
23 Second toothed shaft.
24 Insertion side of lubricant bag.
25 Side of lubricant bag opposite to the insertion side.
26 Lubricant hose.
27 Lubricant nipple connection.
28 Through-going opening.
29 Opening.
30 Connecting flange.
31_P Pressure cylinder.

What is claimed is:

1. A cartridge for use in a filling system, comprising: a piston and a spindle which engages the piston, wherewith the spindle engages a thread in the cartridge and on its end bears means for providing a rotationally rigid connection with an adaptable rotational implement, wherein when the spindle is rotated, the piston is moved in the direction of an outlet opening causing a lubricant to be expelled from the outlet opening, wherein a predetermined breaking point is provided between the piston and the spindle, so the piston shears off from the spindle as soon as the piston is disposed at an end of an axial excursion next to the outlet opening.

2. The cartridge for use in a filling system according to claim 1; wherein the cartridge comprises a rod which extends exteriorly of the cartridge on at least one end, which rod interiorly of the cartridge has a segment in the form of the spindle and has the piston disposed in said segment, which piston has a thread, and said rod also has on its end a structure for providing the rotationally rigid connection to the adaptable rotational implement.

3. The cartridge according to claim 2; wherein a guide is disposed on the interior side of a peripheral wall which prevents the rotation of the piston in a circumferential direction.

4. A cartridge for use in a filling system, comprising: a piston and a spindle which engages the piston, the cartridge having an end wall having an outlet opening, wherein the spindle engages a thread in the end wall of the cartridge which bears the outlet opening, wherein when the spindle is rotated, the piston is moved in the direction of the outlet opening causing a lubricant to be expelled from the outlet opening, and wherein a breaking point is provided between the piston and the spindle that separates the piston from the spindle when the piston is disposed at an end of an axial excursion next to the outlet opening.

\* \* \* \* \*